(12) United States Patent
Kao et al.

(10) Patent No.: US 8,566,562 B2
(45) Date of Patent: Oct. 22, 2013

(54) METHOD FOR SEQUENTIALLY WRITING DATA WITH AN OFFSET TO A NON-VOLATILE MEMORY

(75) Inventors: Yu Mao Kao, Hsinchu (TW); Yung Li Ji, Hsinchu (TW); Chih Nan Yen, Hsinchu (TW); Fuja Shone, Hsinchu (TW)

(73) Assignee: Skymedi Corporation, Hsinchu (TW)

( * ) Notice: Subject to any disclaimer, the term of this patent is extended or adjusted under 35 U.S.C. 154(b) by 1104 days.

(21) Appl. No.: 12/245,093

(22) Filed: Oct. 3, 2008

(65) Prior Publication Data
US 2010/0088458 A1   Apr. 8, 2010

(51) Int. Cl.
*G06F 13/00* (2006.01)
(52) U.S. Cl.
USPC .................. 711/201; 711/103; 711/E12.078
(58) Field of Classification Search
USPC .......................................................... 711/109
See application file for complete search history.

(56) References Cited

U.S. PATENT DOCUMENTS

| 2004/0193786 | A1* | 9/2004 | Inagaki et al. | 711/105 |
| 2005/0144367 | A1* | 6/2005 | Sinclair | 711/103 |
| 2006/0294174 | A1* | 12/2006 | Haque et al. | 708/490 |
| 2007/0160346 | A1* | 7/2007 | Ikeda et al. | 386/95 |
| 2008/0104309 | A1* | 5/2008 | Cheon et al. | 711/103 |

* cited by examiner

*Primary Examiner* — Edward Dudek, Jr.
*Assistant Examiner* — Sean D Rossiter
(74) *Attorney, Agent, or Firm* — WPAT, P.C.; Anthony King

(57) ABSTRACT

An operation method of a memory includes the steps of calculating an offset of sequential write commands and the beginning of pages of a block of a non-volatile memory; shifting the block by the offset; and directly writing data from a host to the pages except the first and last pages of the block by the sequential write commands. In an embodiment, the pages are logical pages providing optimal writing efficiency and are determined before calculating the offset. The step of shifting the block by the offset is to increase corresponding logical block addresses (LBA) in the pages by the offset.

16 Claims, 4 Drawing Sheets

METHOD FOR SEQUENTIALLY WRITING DATA WITH AN OFFSET TO A NON-VOLATILE MEMORY

BACKGROUND OF THE INVENTION (A) Field of the Invention

The present invention relates to a memory operation method, and more specifically, to an operation method of a non-volatile memory.

(B) Description of Related Art

For a non-volatile memory, a block including pages is a unit for erasing. Because the device of a non-volatile memory could include a plurality of channels, the page size of the plurality of channels may be large and the size or the length of a sequential writing command is near to the size of a logical page.

FIG. 1 illustrates a non-volatile memory system 10 of p channels controlled by a control chip 11. Each channel (ch 1 to ch p) may include one or more non-volatile memories. In order to enhance writing efficiency, plural channels could be used at the same time. However, for some non-volatile memories, e.g., an MLC memory, a complete page has to be written at one time. In such case, a complete page of each channel at the same location is written at the same time, and the size of a logical page is known as the "pagesize." The pages 12 at the same location of all channels are considered collectively to be a logical page, whereas the blocks at the same location could be collected as a logical block. A non-volatile memory device may use some blocks mapping to logical block addresses (LBA) for writing sequential data.

As shown in FIG. 2, a host 20 may generate a write command to write data of a short length or the data may not be aligned with the beginning of the logical page; thus the data cannot be written to the non-volatile memory 24 directly, and a buffer 22, e.g., a DRAM, is used for collecting the data until the data can be written to a logical page of a non-volatile memory 24 (Path 1). If the amount of data is larger than or equal to a logical page and the writing position is the beginning of the logical page, the data will be written to the non-volatile memory 24 directly (Path 2).

However, many sequential writing commands do not start at the beginning of a logical page. As shown in FIG. 3, $W_{128}(8)$ denotes a 64K (128 sectors) write command starting from LBA 8. Because the writing command $W_{128}(8)$ does not start writing at the beginning of the logical page, $W_{128}(8)$ must be divided into two commands $W_{120}(8)$ and $W_8(128)$. In other words, data is written to 120 sections starting from LBA 8, and then the remaining data is written to 8 sectors starting from LBA 128. Because both $W_{120}(8)$ and $W_8(128)$ are less than 64K, the data is temporarily stored in the buffer 22 before being written the non-volatile memory 24. Until the buffer 22 collects sufficient data to be written to a logical page (e.g., 128 sectors), a writing command $W_{128}(0)$ is sent to the non-volatile memory 24. If the host 20 generates $W_{128}(0)$, the non-volatile memory 24 is programmed by $W_{128}(0)$ directly.

Likewise, every sequential write command of $W_{128}(8)$, i.e., $W_{128}(8+128)$, $W_{128}(8+256)$ ..., goes to the buffer 22 before being programmed to the non-volatile memory 24. For example, $W_{128}(136)$ is divided into $W_{120}(136)$ and $W_8(256)$.

Accordingly, every command is divided into two commands and data has to be stored in the buffer temporarily. The data is written to the non-volatile memory until the data is collected to be the amount of a logical page. As a result, the writing efficiency is decreased, and the use of the buffer for temporarily storing data increases power consumption.

SUMMARY OF THE INVENTION

The present invention provides a memory operation method for a non-volatile memory, so as to effectively write data to the non-volatile memory when a sequential write command does not start from the beginning of a logical page.

According to the present invention, an operation method of a memory includes the steps of calculating an offset of sequential write commands and the beginning of pages of a block of a non-volatile memory; shifting the block by the offset; and directly writing data from a host to the pages except first and last pages of the block by the sequential write commands.

In an embodiment, the pages are logical pages providing optimal writing efficiency and are determined before calculating the offset. The offset value is in a range from 0 to a pagesize of the logical page. The step of shifting the block by the offset is to increase corresponding logical block addresses (LBA) in the pages by the offset.

As a result, the pages except the first and last pages in the block can be directly written by the sequential write commands, so that the writing efficiency for the non-volatile memory is significantly increased. Moreover, the time needed for temporarily storing the data in the volatile memory is tremendously decreased, thereby reducing the power consumption.

DETAILED DESCRIPTION OF THE INVENTION

Embodiments of the present invention will now be described with reference to the accompanying drawings.

Figure 1:
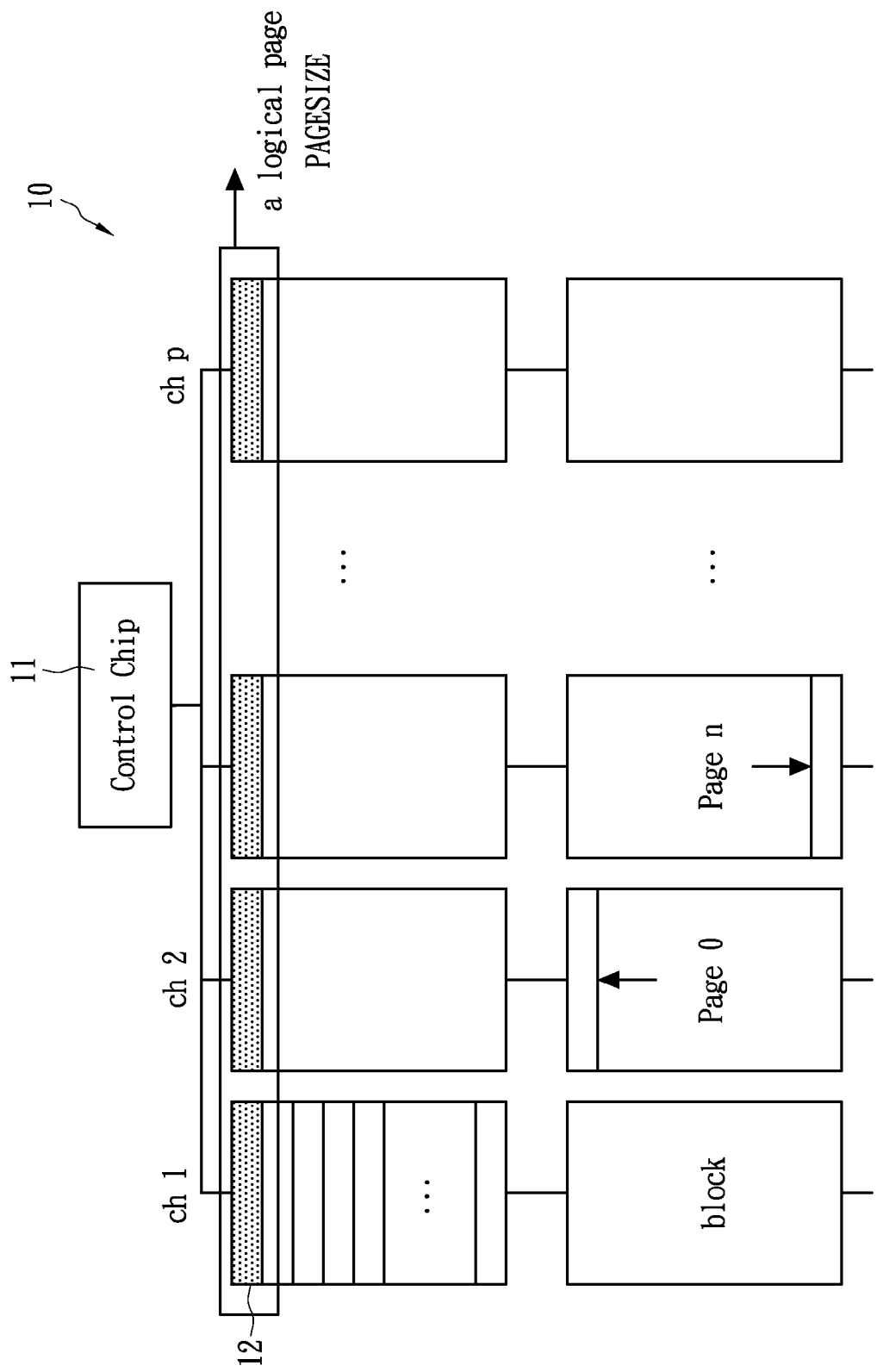
FIG. 1 illustrates a non-volatile memory structure.
Figure 2:
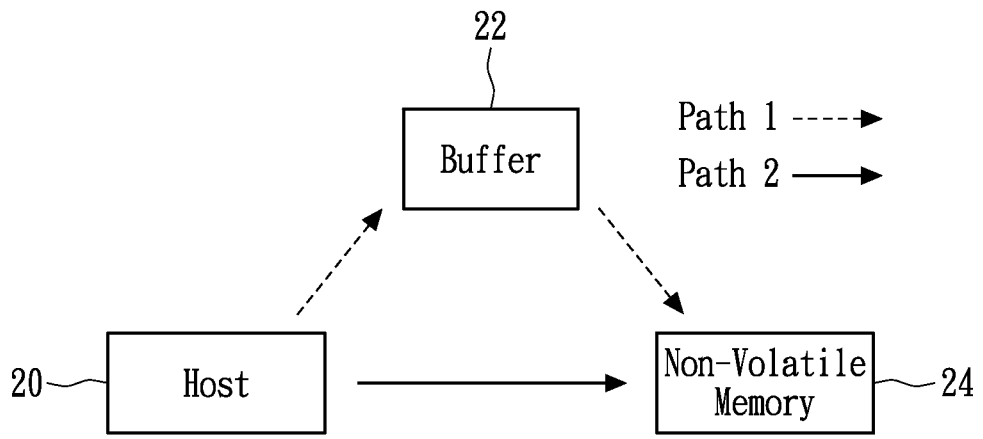
FIGS. 2 and 3 illustrate a known operation method for writing data to a non-volatile memory.
Figure 3:
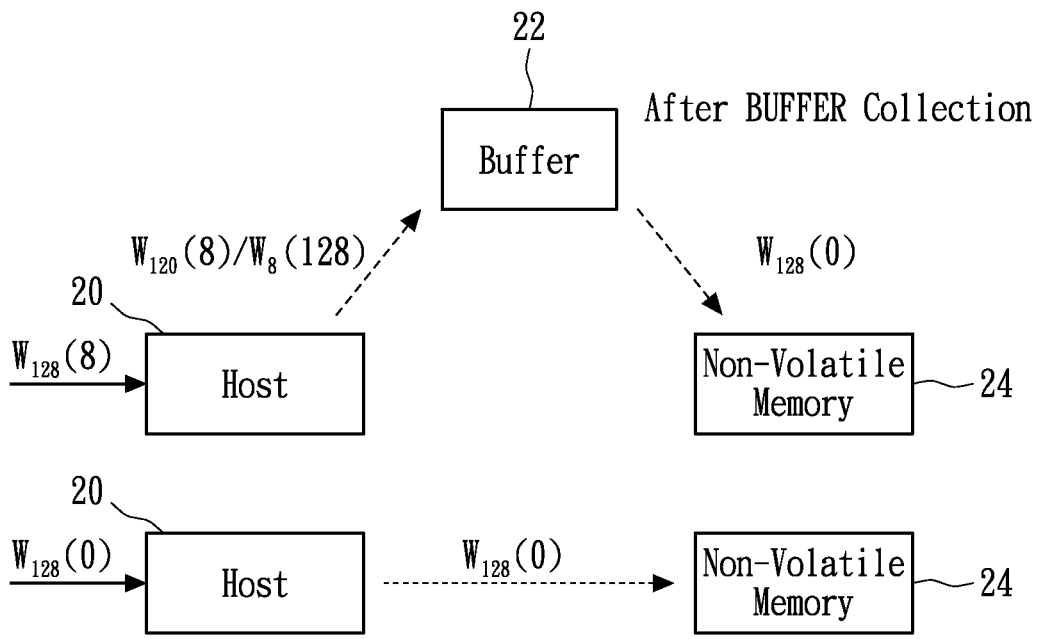
Figure 4:
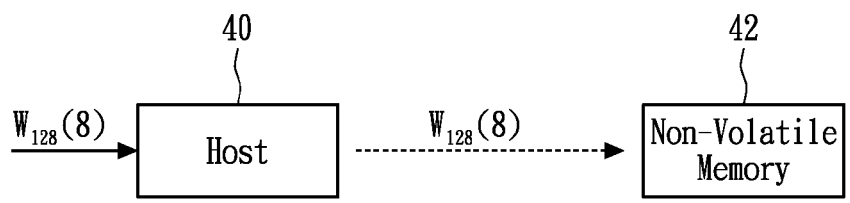
FIGS. 4, 5A, 5B and 6 illustrate the operation method of a memory in accordance with an embodiment of the present invention.

FIG. 4 illustrates an operation method for writing data to the non-volatile memory according to an embodiment of the present invention. A write command $W_{128}(8)$ from a host 40 need not go through a buffer and instead is written directly to the non-volatile memory 42. The details for achieving this objective are described below.

Figure 5A:
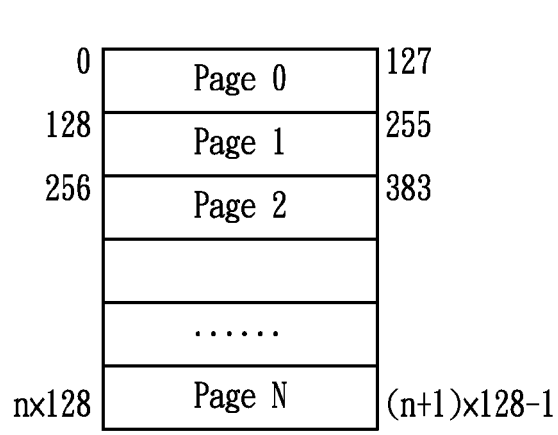
Figure 5B:
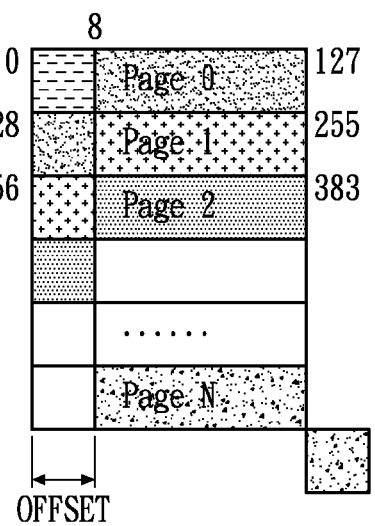

FIG. 5A illustrates the pages of a block corresponding to LBA, in which, for example, page 0 stores data corresponding to LBA 0 to LBA 127, and page 1 stores data corresponding to LBA 128 to LBA 255. However, if a write command does not start from the beginning of a page, the write command needs to be divided into two commands according to prior arts. For instance, $W_{128}(8)$ starts from LBA 8, so $W_{128}(8)$ is divided into $W_{120}(8)$ and $W_8(128)$. $W_{120}(8)$ corresponds to LBA 8 to 127 of Page 0, whereas $W_8(128)$ corresponds to LBA 128 to LBA 135 of Page 1. Likewise, the next sequential write commands such as $W_{128}(136)$ and $W_{128}(264)$ perform the same task. At the last Page N of the sequential write commands, the write command $W_{128}$ already exceeds the block, i.e., the related 8 sectors are out of block as shown FIG. 5B. In FIG. 5B, there is an offset of 8 sectors for sequential write commands $W_{128}$.

Figure 6:
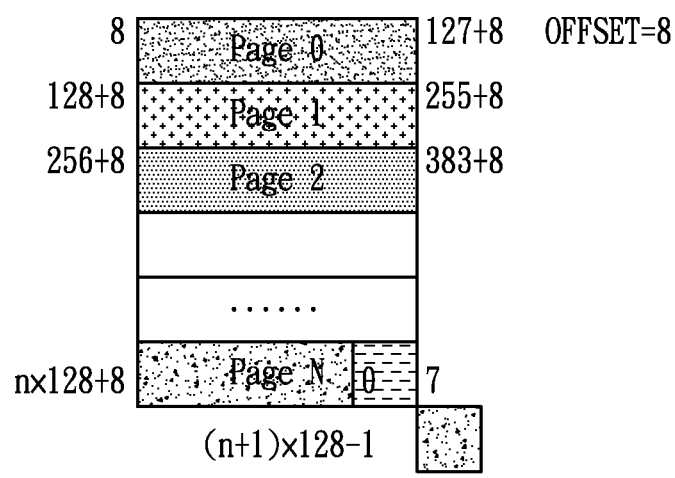

When a host sends sequential commands $W_{128}$, the offset of the sequential write commands $W_{128}$ and the beginning of Page 0 is recorded, and then the block to be written is shifted by the offset. In FIG. 6, the offset of the sequential write commands $W_{128}$ is 8 sectors, Page 0 is shifted to correspond to LBA 8 to LBA (127+8); Page 1 is shifted to correspond to LBA (127+8) to LBA (255+8). In other words, shifting the block by the offset is to increase corresponding LBA in the pages by the offset, e.g., Page n is shifted to correspond to LBA ((n−1)×128+8) to LBA ((n×128)−1), where n is equal to 1, 2, 3, . . . . First, the data from the beginning of Page 0 to the offset 8 is stored to a buffer, and as a result the block can receive the write command of a pagesize of 64K, i.e., the write command can be sent to the non-volatile memory directly. The data from the beginning to the offset of the Page 0 of the block can be temporarily stored in a volatile memory, an area of the non-volatile memory or an electronic storage device. Because the last page (Page N) of the block has only 120 sectors, Page N cannot be written by a complete write command $W_{128}$. Therefore, $W_{128}$ also needs to be divided into $W_{120}$ and $W_8$. $W_{120}$ combines the data from the beginning of the page to the offset, i.e., LBA 0 to LBA 7, so that the combination can be written to Page N. $W_8$ for the last sequential write command is assigned to the next block to be written.

For reading data in the block, an offset is needed for verifying the corresponding LBAs in the shifted block. Therefore, the value of the offset has to be recorded. For example, the offset also can be stored in a volatile memory, a spare area of the non-volatile memory or an electronic storage device.

The page of the above embodiment may be a "logical page" providing optimal writing efficiency and determined before calculating the offset. The determination of the logical page depends on the factors such as multiple channels, multi-plane, SLC/MLC, interleave. The offset value is in a range from 0 to a pagesize of the logical page.

According to the present invention, the block has an offset when writing data to the block at any given time. Nevertheless, the block may have different offsets when writing data to the block at different times. Moreover, the blocks of the non-volatile memory need not all have the same offset. Some blocks may have the offset, but some have not.

The above-described embodiments of the present invention are intended to be illustrative only. Numerous alternative embodiments may be devised by those skilled in the art without departing from the scope of the following claims.

What is claimed is:

1. An operation method of a memory, comprising the steps of:
   Calculating a logical block address (LBA) offset between a start logical block address of a sequential write command and a beginning logical block address of a logical page of a logical block of a non-volatile memory, the logical block including a first logical page, a last logical page and at least one logical page between the first logical page and the last logical page;
   shifting the logical block by the LBA offset; and
   directly writing data from a host to the first logical page and the at least one logical page of the logical block except the last logical page of the logical block by the sequential write command.

2. The operation method of claim 1, further comprising a step of determining the logical page before calculating the LBA offset.

3. The operation method of claim 1, wherein the LBA offset is a value in a range from 0 to a pagesize of the logical page.

4. The operation method of claim 3, wherein the logical page of the logical block is the first logical page of the logical block.

5. The operation method of claim 1, wherein data from the beginning logical block address of the logical page of the logical block to the LBA offset of the logical page of the logical block is temporarily stored in a device.

6. The operation method of claim 5, wherein the device is a volatile memory, an area of the non-volatile memory or an electronic storage device.

7. The operation method of claim 5, wherein the data stored from the beginning logical block address of the logical page of the logical block to the LBA offset of the logical page of the block temporarily stored in the device is written to the last logical page of the logical block.

8. The operation method of claim 5, wherein the last write command of the sequential write command is divided into a first sub-command and a second sub-command.

9. The operation method of claim 8, wherein the first sub-command combining the data stored from the beginning logical block address of the logical page of the logical block to the LBA offset of the logical page of the logical block and the data to be written to the last logical page of the logical block is written to the last logical page of the logical block.

10. The operation method of claim 8, wherein the second sub-command is written to another logical block.

11. The operation method of claim 1, wherein the step of shifting the logical block by the LBA offset is to increase corresponding logical block addresses in the logical pages by the LBA offset.

12. The operation method of claim 1, wherein the LBA offset is stored in a device for being read.

13. The operation method of claim 12, wherein the device is a volatile memory, an area of the non-volatile memory or an electronic storage device.

14. The operation method of claim 1, further comprising a step of reading the logical block with reference to the LBA offset after writing data by the sequential write command.

15. An operation method of a memory, comprising the steps of:
   calculating a logical block address (LBA) offset between a start logical block address of a sequential write command and a beginning logical block address of a logical page of a logical block of a non-volatile memory, the logical block including a first logical page, a last logical page and at least one logical page between the first logical page and the last logical page;
   shifting the logical block by the LBA offset; and
   directly writing data from a host to the first logical page and the at least one logical page of the logical block except the last logical page of the logical block by the sequential write command,
   wherein data from the beginning logical block address of the logical page of the logical block to the LBA offset of the logical page of the logical block is temporarily stored in a device, and
   wherein the data stored from the beginning logical block address of the logical page of the logical block to the LBA offset of the logical page of the block temporarily stored in the device is written to the last logical page of the logical block.

16. An operation method of a memory, comprising the steps of:
   calculating a logical block address (LBA) offset between a start logical block address of a sequential write command and a beginning logical block address of a logical page of a logical block of a non-volatile memory, the logical block including a first logical page, a last logical page and at least one logical page between the first logical page and the last logical page;

shifting the logical block by the LBA offset; and
directly writing data from a host to the first logical page and the at least one logical page of the logical block except the last logical page of the logical block by the sequential write command,
wherein data from the beginning logical block address of the logical page of the logical block to the LBA offset of the logical page of the logical block is temporarily stored in a device,
wherein the last write command of the sequential write command is divided into a first sub-command and a second sub-command, and
wherein the first sub-command combining the data stored from the beginning logical block address of the logical page of the logical block to the LBA offset of the logical page of the logical block and the data to be written to the last logical page of the logical block is written to the last logical page of the logical block.

* * * * *